Feb. 4, 1930.  W. M. WEISS  1,746,066
METER READING DEVICE
Filed Jan. 23, 1929
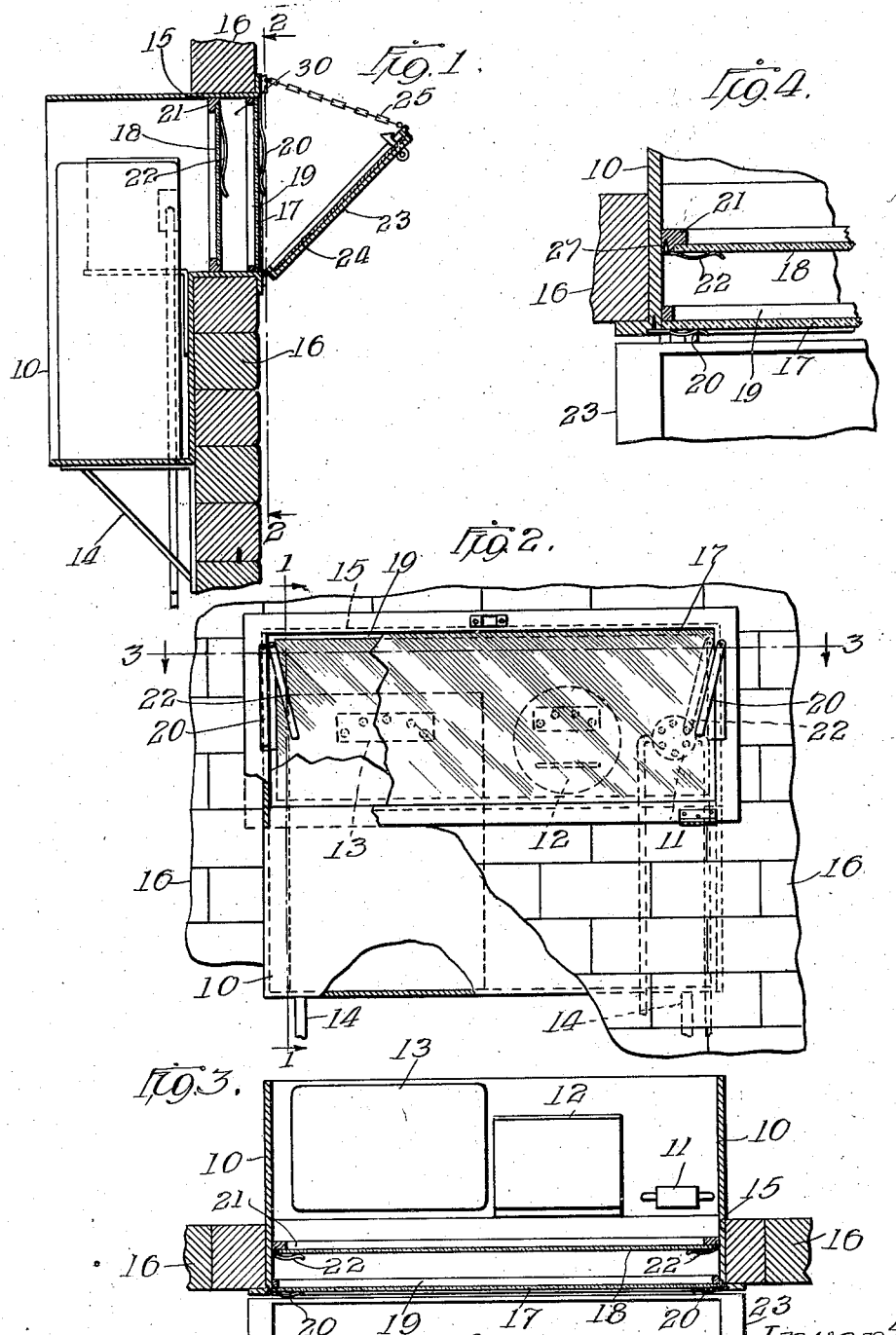

Patented Feb. 4, 1930

1,746,066

UNITED STATES PATENT OFFICE

WILLIAM M. WEISS, OF MAYWOOD, ILLINOIS

METER-READING DEVICE

Application filed January 23, 1929. Serial No. 334,552.

My invention relates to meter receptacles or housings and more particularly it relates to housings for meters which are adapted to be located adjacent the exterior wall of a building in which they are mounted, such as, for example, the basement room of a dwelling or the like to enable the meters to be read from the exterior of the building.

In such devices, as heretofore constructed, difficulty has been experienced in reading the meter from the outside, because the illumination of the space about the meter is usually of less intensity than the light immediately surrounding the outside observer, and one object of the invention is the provision of improved means operable to reflect the outside light directly upon the meter, thereby providing the meter with substantially the same intensity of illumination as that of the space occupied by the outside observer. A portion of such a receptacle must necessarily extend through or into the wall of the building and to prevent the passage of outside air into the receptacle requires a glass or other transparent outer wall for closing the projecting portion. Where glass has been provided in the usual manner for such receptacles, they become frosty in cold weather and murky and cloudy in damp weather, under which conditions it is sometimes impossible to read the meter, and another object of the invention is to provide a closed housing of the class described so arranged and constructed as to permit meters to be read therethrough during any and all conditions of weather.

Still another object is the provision of improved means for reflecting the exterior light directly upon the meter dials.

Many other objects and advantages of the construction herein shown and described will be obvious to those skilled in the art from the disclosure herein given.

To this end my invention consists in the novel construction, arrangement and combination of parts herein shown and described and more particularly pointed out in the claims.

In the drawings, wherein like reference characters indicate like or corresponding parts:

Fig. 1 is a sectional view through the device of my invention taken on line 1—1 of Fig. 2;

Fig. 2 is a view on the line 2—2 of Fig. 1;

Fig. 3 is a view along the line 3—3 of Fig. 2; and

Fig. 4 is a detail of construction drawn to a larger scale.

Referring now to the drawings, the numeral 10 generally designates a housing or receptacle in which a water meter 11, an electric meter 12 and a gas meter 13 are positioned. The main receptacle or housing member 10 is shown as positioned adjacent a basement wall 16 and as supported on brackets 14. The wall 16 may, however, be any exterior or any partition wall closing off the room in which the meters are located.

The device makes it practicable to read the meters without entering the room in which they are mounted. The receptacle 10 is provided for this purpose with an upper laterally extending member 15 which projects through the wall. The rear portion of the housing 10 is shown as open but may, if desired, be closed either by a solid wall or by doors which permit access to the meters. The lateral extension 15 is closed by a pane of glass 17 mounted near its outer end. The glass 17 is held in position against a frame 19 by a detent member 20. A second pane of glass 18 smaller than the pane 17 is positioned inwardly a short distance from the pane 17 and is similarly held in position against a frame 21 by a detent member 22. The two panes of glass 17 and 18 form inner closures between which is an air chamber 30. The chamber 30 prevents frost gathering on either of the panes of glass during cold weather and also prevents moisture films forming thereon by reason of the basement temperature being cooler than the outside temperature.

The meters 11, 12 and 13 are preferably positioned near the upper portion of the receptacle 10 so as to be easily seen from a point slightly above the top portion of the receptacle.

The laterally projecting portion 15 of the receptacle has a cover 23 forming an outer closure member. The cover 23 is hingedly mounted at its lower end and is provided at its upper end with a latch 24. Suitable means for locking the cover in closed position may be placed on the outside of the device, if desired. A chain 25 permits the cover 23 to be lowered to an angle of substantially 45° in which position an observer on the outside can readily see the dial faces of the meters. The inner face of the cover 23 is provided with a mirror 26 for the purpose of reflecting the exterior light longitudinally inward upon the dial faces of the meters and enables the meters to be read more easily. A coat of white material can be substituted for the mirror as a reflecting means if desired. In the position shown for the cover 25, the meters are in the path of the reflected rays of light and are thereby subject to the best conditions of illumination from the exterior.

The panes of glass 17 and 18 are so mounted as to be removed from the exterior and thereby permit easy access to the interior of the receptacle. The detent members 20 and 22 for this purpose are pivotally mounted at one end on a screw 27, or the like. The screws 27 are fastened in the vertical side walls of the frames 19 and 21. The side walls of the frames 19 and 21 are each provided with apertures 28 which permit the detent members 20 and 22 to be positioned therein when it is desired to remove the panes of glass 17 and 18 for any purpose. The dimensions of the outer glass 17 and its mounting in the pane 19 are preferably greater than the corresponding dimensions of the glass 18 and its mounting 21, thereby insuring the easy removal and replacement of the panes 17 and 18.

Thus it will be seen that I have provided means enabling meters positioned in the basement of dwellings, apartments, etc., to be read from the exterior, thereby avoiding the necessity of permitting the building to be entered for that purpose.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. A device of the class described comprising a main housing member, a lateral extension member opening into said main housing member, a plurality of spaced apart transparent closure members forming air chambers in said extension member, an opaque closure member hingedly mounted to open outwardly and downwardly at substantially an angle of 45° to the extension member, and light reflecting means on the inner face of said opaque closure member.

2. A device of the class described comprising a main housing member, a lateral extension member opening into said main housing member, an opaque closure member hingedly mounted to open outwardly and downwardly at substantially an angle of 45° to the extension member, and light reflecting means on the inner face of said opaque closure member.

3. A device of the class described comprising a main housing member, a lateral extension member opening into said housing member, outer and inner transparent closure members removably mounted in the extension member, the outer of said closure members and its mounting being of larger dimensions than the corresponding dimensions of the inner closure member and its mounting, a plurality of detent fastening means for said closure members operable from the outer end of the extension member to permit the removal outwardly of said closure members, an opaque closure member on the outer end of the extension member, said opaque closure member being hingedly mounted to open outwardly and downwardly at an angle of 45° to the extension member, and light reflecting means on the inner face of said opaque closure member.

4. A device of the class described comprising a main housing member, a lateral extension member opening into the main housing member, a plurality of transparent vertical closure members forming air chambers in the extension member, rabbeted annular frames providing mountings for the closure members, a plurality of detent members pivotally mounted on the frames operable to hold the closure members in vertical position, the exposed exterior portions of said frames being notched to provide recesses adapted to receive said detent members when they are swung out of operative holding positions, the dimensions of the outer closure member being greater than the corresponding dimensions of the adjacent closure member, an opaque closure member hingedly mounted to open outwardly and downwardly at substantially an angle of 45° to the extension member, and light reflecting means on the inner face of said closure member.

In witness whereof, I hereunto subscribe my name this 12th day of January A. D., 1929.

WILLIAM M. WEISS.